(12) United States Patent
Shimizu

(10) Patent No.: US 10,254,560 B2
(45) Date of Patent: Apr. 9, 2019

(54) LENS BARREL AND OPTICAL APPARATUS

(71) Applicant: SAMSUNG ELECTRONICS CO., LTD., Suwon-si (KR)

(72) Inventor: Yoshiaki Shimizu, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 60 days.

(21) Appl. No.: 15/095,564

(22) Filed: Apr. 11, 2016

(65) Prior Publication Data

US 2016/0299313 A1 Oct. 13, 2016

(30) Foreign Application Priority Data

Apr. 9, 2015 (JP) .................................. 2015-080223
Dec. 17, 2015 (JP) .................................. 2015/246042
Mar. 7, 2016 (KR) ....................... 10-2016-0027135

(51) Int. Cl.
*G02B 27/64* (2006.01)
*G02B 7/10* (2006.01)

(52) U.S. Cl.
CPC ........... *G02B 27/646* (2013.01); *G02B 7/102* (2013.01)

(58) Field of Classification Search
CPC ...... G02B 27/646; G02B 7/102; G02B 27/64; G02B 7/04; G02B 27/642; G02B 27/644; G02B 27/648; G03B 2205/0007; H04N 5/23264
USPC ..... 359/554–557, 700; 396/52–55, 348–350; 356/624
See application file for complete search history.

(56) References Cited

U.S. PATENT DOCUMENTS

| 6,724,541 B2 * | 4/2004 | Noguchi ................ G02B 7/102 |
| | | 359/700 |
| 6,989,944 B2 | 1/2006 | Yasutomi et al. |
| 7,995,099 B2 | 8/2011 | Maeda |
| 2005/0231832 A1 | 10/2005 | Aoki et al. |
| 2007/0092246 A1 | 4/2007 | Aoki et al. |
| 2011/0032626 A1 | 2/2011 | Tsuji |
| 2012/0019939 A1 | 1/2012 | Nakada et al. |

FOREIGN PATENT DOCUMENTS

| JP | 2003-90947 A | 3/2003 |
| JP | 2003-279827 A | 10/2003 |
| JP | 2006-106241 A | 4/2006 |
| JP | 2007114532 A | 5/2007 |
| JP | 2008170793 A | 7/2008 |
| JP | 2014-39651 A | 3/2014 |

OTHER PUBLICATIONS

Communication dated Jul. 6, 2016, issued by the International Searching Authority in counterpart International Application No. PCT/KR2016/003385 (PCT/ISA/210 & PCT/ISA/237).

* cited by examiner

*Primary Examiner* — Kristina M Deherrera
(74) *Attorney, Agent, or Firm* — Sughrue Mion, PLLC

(57) ABSTRACT

A lens barrel having a reduced size and a related optical apparatus is disclosed. The lens barrel includes a cylindrical fixed frame and a cylindrical movable frame. The cylindrical first frame includes an outer wall extending around the optical axis and a cylindrical second frame is inserted thereto the first frame. The first frame includes a notch having first assembly portions at both side portions. The second frame includes second assembly portions that are assembled to be fixed to the first assembly portions.

16 Claims, 11 Drawing Sheets

LENS BARREL AND OPTICAL APPARATUS

CROSS-REFERENCE TO RELATED APPLICATIONS

This application claims the benefit from Japanese Patent Application No. 2015-080223, filed on Apr. 9, 2015, Japanese Patent Application No. 2015-246042, filed on Dec. 17, 2015, in the Japanese Patent Office, and Korean Patent Application No. 10-2016-0027135, filed on Mar. 7, 2016, in the Korean Patent Office, and the disclosures of which are incorporated herein by reference in their entireties.

BACKGROUND

1. Field

Apparatuses consistent with exemplary embodiments relate to a lens barrel and an optical apparatus.

2. Description of the Related Art

Recently, as the sizes of imaging apparatuses, such as cameras, reduce, demands for small optical apparatuses are increasing. An example of optical apparatuses, used as a component of a camera, may be a so-called zoom lens by which a user may freely change a focal length. A zoom lens may include therein a mechanism for moving lens groups and a mechanism for supporting and moving movable groups generally arranged inside a lens barrel. In detail, a zoom lens may include a lens barrel (which may be also called as a zoom lens barrel or a zoom barrel) that includes a cam frame having a cam groove, a fixed frame having a straight guiding groove, and a movable frame having a driving pin assembled to both the cam groove and the straight guiding groove.

Regarding the lens barrel, because the straight guiding groove in the fixed frame and the cam groove in the cam frame are arranged to cross each other and the driving pin of the movable frame is assembled to both the straight guiding groove and the cam groove crossing each other, the driving pin needs to have a certain size or to be larger than the certain size to ensure that the driving pin has sufficient strength to drive the cam frame and the fixed frame. Therefore, it is necessary to increase the width of the straight guiding groove or the cam groove along with the increasing size of the driving pin. Thus, additional spaces may be required at the outer wall of the fixed frame or the cam frame.

Furthermore, the cylindrical outer wall including a straight guiding groove, such as the fixed frame, may be integrated as a single element to secure sufficient strength for preventing deformation of the straight guiding groove when a lens barrel is dropped on the floor. In other words, if there is a cut portion formed by cutting a portion of the outer wall in the lengthwise direction thereof, it may be difficult for a lens barrel to have necessary strength.

In addition, it is also necessary to accommodate portions other than the straight guiding groove of a cylindrical outer wall. However, it might also be difficult to accommodate because of the size reduction of a lens barrel.

SUMMARY

According to an objective of exemplary embodiments, there is proided a lens barrel, which has a reduced size embodied by securing sufficient positional stability and shock resistance of parts arranged therein (e.g., movable groups) and reducing spaces for arranging movable parts, and an optical apparatus.

Additional aspects will be set forth in part in the description which follows and, in part, will be apparent from the description, or may be learned by practice of the presented embodiments.

According to an aspect of an exemplary embodiment, there is provided a lens barrel including: a cylindrical fixed frame extending along an optical axis; and a cylindrical movable frame, configured to move along the optical axis with respect to the fixed frame. The cylindrical movable frame includes a cylindrical first frame including the outer wall extending around the optical axis and a cylindrical second frame configured to be inserted thereto the first frame, wherein the first frame includes a notch including first assembly portions at both side portions, and the second frame includes second assembly portions configured to be assembled to be fixed to the first assembly portions.

The lens barrel may further include a first cam frame, configured to rotate with respect to the cylindrical fixed frame around the optical axis; and a cylindrical cam frame, configured to rotate around the optical axis in conjunction with the rotation of the first cam frame and moves along the optical axis, wherein the cylindrical first frame and the cylindrical second frame may move along the optical axis in conjunction with the rotation and the movement of the cylindrical cam frame.

The lens barrel may further include a manipulation ring configured to around the optical axis by a user; and a zoom motor unit configured to drive the first cam frame to rotate according to a rotation amount of the manipulation ring.

The notch may accommodate a certain part.

A hand-shake compensating unit may be accommodated inside the notch.

A first assembly unit may include assembly grooves extending along the optical axis, and a second assembly unit may include assembly protrusions extending along the optical axis.

The lens barrel may further include a connecting portion configured to interconnect portions of the notch.

A single lens or a plurality of lenses may be arranged at each of the first frame and the second frame.

According to an aspect of an exemplary embodiment, there is provided a lens barrel including a cylindrical fixed frame extending along an optical axis; and a cylindrical movable frame, configured to move along the optical axis with respect to the cylindrical fixed frame. The cylindrical movable frame includes an outer wall extending around the optical axis, wherein the movable frame includes a notch, the notch includes first assembly portions at both side portions, and the fixed frame includes second assembly portions configured to be assembled to be fixed to the first assembly portions.

The lens barrel may further include a cylindrical cam frame configured to rotate with respect to the cylindrical fixed frame around the optical axis, wherein the movable frame configured to move along the optical axis in conjunction with the rotation of the cylindrical cam frame.

The notch may accommodate a certain part.

A hand-shake compensating unit may be accommodated inside the notch.

A first assembly unit may include assembly grooves extending along the optical axis, and a second assembly unit may include assembly protrusions extending along the optical axis.

According to an aspect of an exemplary embodiment, there is provided a lens barrel including a cylindrical fixed frame extending along an optical axis; and a cylindrical movable frame, configured to move along the optical axis with respect to the cylindrical fixed frame along the optical axis, wherein the cylindrical movable frame includes a cylindrical first sub-frame including an outer wall extending around the optical axis, a second sub-frame, and a third sub-frame that is supported by a pair of line shafts arranged between the first sub-frame and the second sub-frame, the first sub-frame includes a notch, the notch includes first assembly portions at both side portions, the second sub-frame includes a pair of shaft holes configured to allow the pair of lines shafts to be inserted in, and the third sub-frame includes second assembly portions configured to be assembled to be fixed to the first assembly portions and a pair of connecting portions to which the pair of line shafts are assembled.

The third sub-frame may include a first frame piece arranged inside the notch, and either one of the pair of connecting portions may be arranged at the first frame piece.

A first assembly unit may include assembly grooves extending along the optical axis, and a second assembly unit may include assembly protrusions extending along the optical axis.

The assembly protrusions may be arranged at both side end portions of the first frame piece and are slidably assembled to the assembly grooves.

A single lens or a plurality of lenses may be arranged at the third sub-frame.

The second sub-frame may include a second frame piece, which is arranged inside the notch to overlap the outer circumferential surface of the first frame piece, the connecting portions arranged at the first frame piece may be grooves arranged in the outer circumferential surface of first frame piece, and the line shafts may be arranged between the grooves and the second frame piece.

According to an aspect of an exemplary embodiment, there is provided an optical apparatus including any one of the lens barrels.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF THE EXEMPLARY EMBODIMENTS

Figure 1:
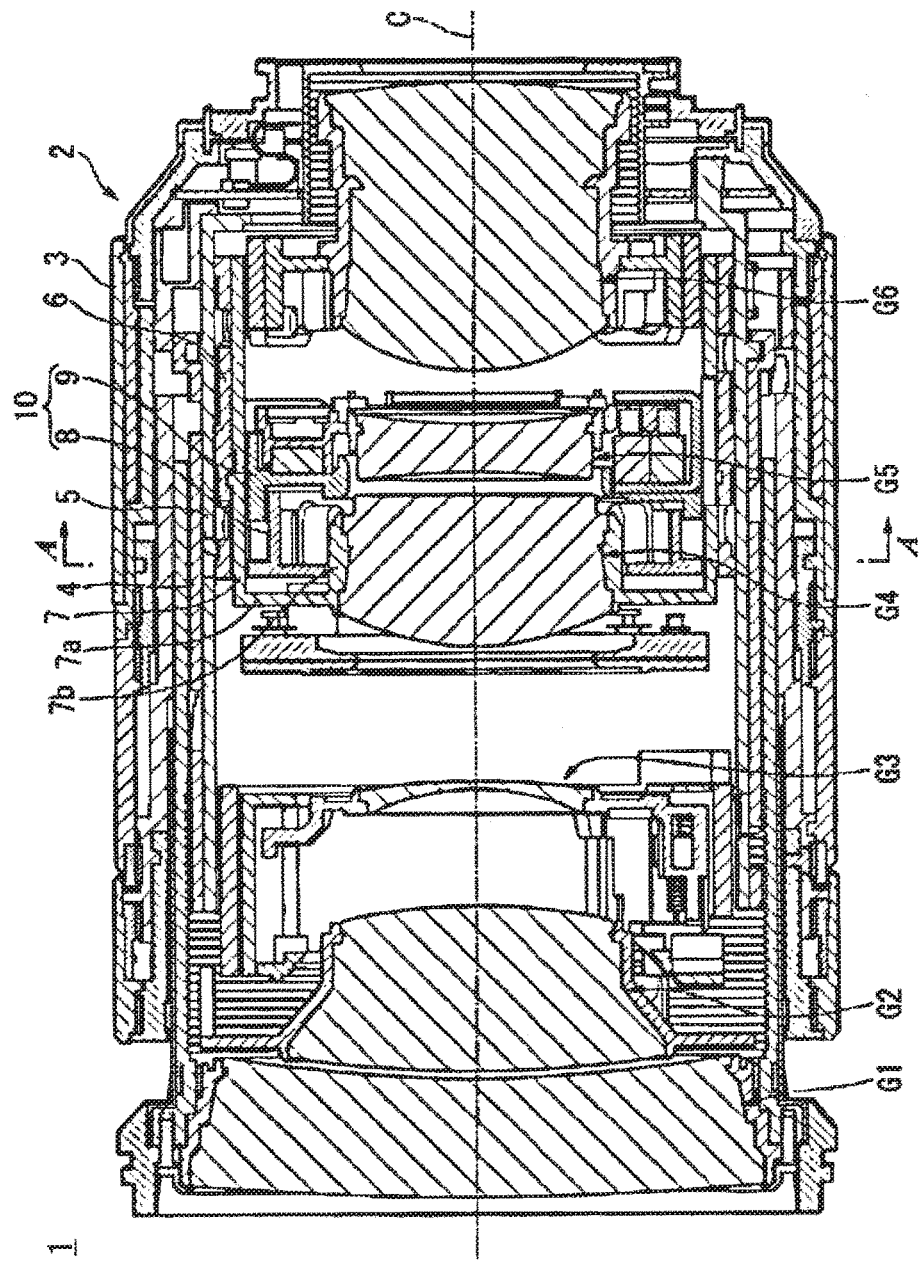
FIG. 1 is a lateral sectional diagram showing the internal structure of an exchangeable lens (optical apparatus) according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

Hereinafter, lens barrels and optical apparatuses according to embodiments will be described below in detail with reference to the assembled drawings. Optical apparatuses according to embodiments may include an imaging apparatus using a imaging device, such as a lens-exchangeable system camera, a digital camera, a video camera, and a surveillance camera, or an exchangeable lens used thereby. A lens barrel according to an embodiment may be included in an exchangeable lens used by the imaging apparatus.

Figure 2:
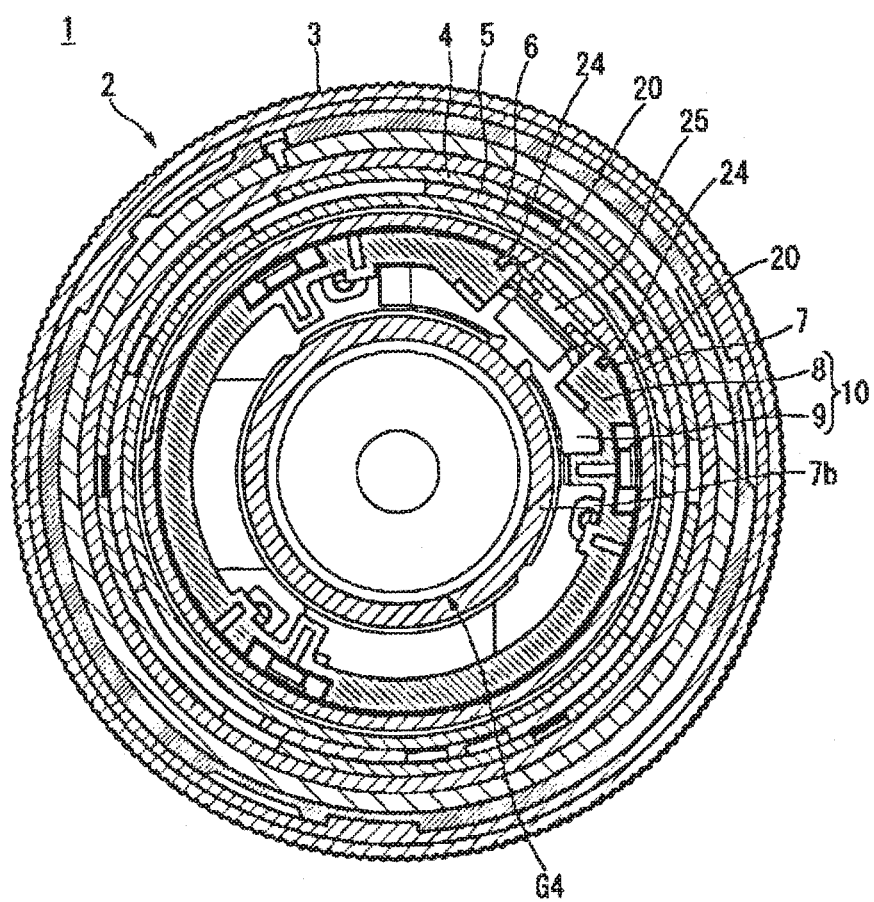
FIG. 2 is a sectional view obtained along a line A-A of FIG. 1.

FIG. 1 is a lateral sectional diagram showing the internal structure of an exchangeable lens (optical apparatus) according to an exemplary embodiment, and FIG. 2 is a sectional view obtained along a line A-A of FIG. 1. In FIGS. 1 and 2, the reference numeral 1 denotes an exchangeable lens and the reference numeral C denotes the optical axis. As shown in FIG. 1, the exchangeable lens 1 may include a lens barrel 2 in which a plurality of lens groups G1 through G6 are arranged along the optical axis C. An inner-focus (IF) zoom lens may be embodied by the plurality of lens groups G1 through G6 arranged inside the lens barrel 2.

The zoom lens may include a first lens group G1, a second lens group G2, a third lens group G3, a fourth lens group G4, a fifth lens group G5, and a sixth lens group G6 that are sequentially arranged from an object side (the front side of the exchangeable lens 1). Each of the first through sixth lens groups G1 through G6 may include a single lens or a plurality of lenses.

For example, in the zoom lens, a zooming function may be embodied by moving the first lens group G1 and the third through sixth lens groups G3 through G6 along the optical axis C, and focusing function may be embodied by moving the third lens group G3 along the optical axis C. Here, the second lens group G2 may be a fixed lens group that does not move. However, the configuration of a zoom lens according to an exemplary embodiment is not limited thereto. For example, the number of lenses or a combination of lenses may vary.

As shown in FIGS. 1 and 2, in order to move lens groups (particularly, the fourth lens group G4 and the fifth lens group G5) in the zoom lens, the lens barrel 2 may include a cylindrical first cam frame 4 that is arranged to be able to rotate around the optical axis C in conjunction with a manipulation ring 3, a cylindrical fixed frame 5 arranged inside the first cam frame 4, a cylindrical second cam frame 6 arranged inside the fixed frame 5, a cylindrical fourth lens group movable frame (second frame) 7 arranged inside the second cam frame 6, and a fifth lens group movable frame 10 that is arranged inside the fourth lens group movable frame 7 and includes a first frame 8 and a lens frame 9. In this exemplary embodiment, the first cam frame 4 and the second cam frame 6 may constitute a cam frame according to an exemplary embodiment, whereas the fourth lens group movable frame (second frame) 7 and the first frame 8 may constitute a movable frame according to an exemplary embodiment.

Figure 3:
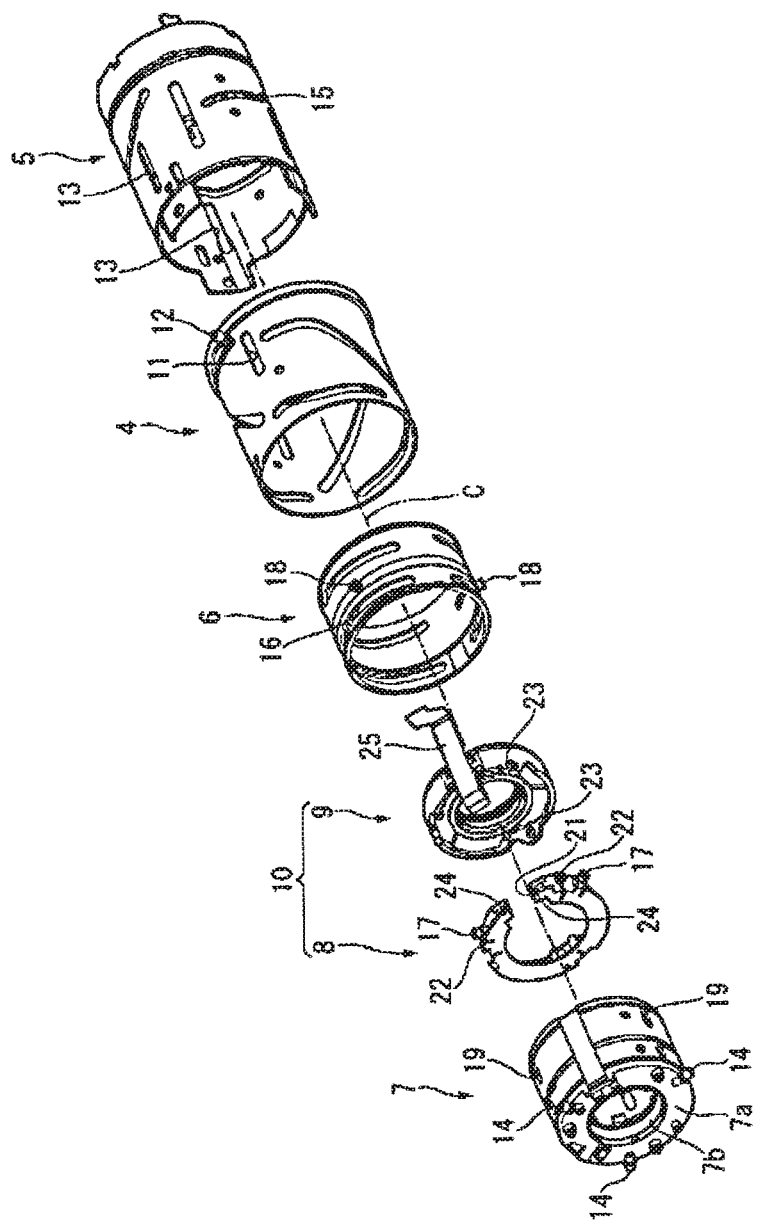
FIG. 3 is an exploded perspective view of the lens barrel 2.

The cylindrical manipulation ring 3 may be arranged on the outer circumferential surface at the rear side of the first cam frame 4 to be able to rotate in a clockwise direction and a counterclockwise direction. In conjunction with a manipulation for rotating a manipulation unit including the manipulation ring 3, the first cam frame 4 may rotate in a direction in which the manipulation ring 3 rotates. FIG. 3 is an exploded perspective view of the lens barrel 2. As shown in FIG. 3, three cam frame straight-guiding grooves 11 extending along the optical axis C may be arranged at outer wall of the first cam frame 4. The cam frame straight-guiding grooves 11 may be arranged at different locations of the first cam frame 4 to divide the outer surface of the first cam frame 4 into three portions. The divided three portions of the outer surface are substantially equal and each corresponding to an angle of 120°±10°. Furthermore, three connecting pins 12 may be connected to the manipulation unit, e.g., the manipulation ring 3, and may be arranged on the outer surface of the first cam frame 4. Furthermore, the first cam frame 4 may further include a plurality of cam grooves.

Figure 4:
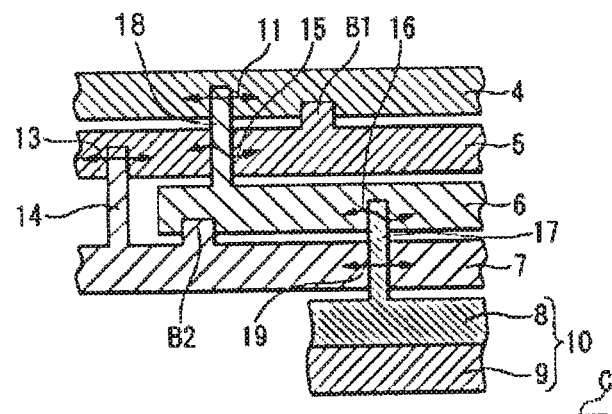
FIG. 4 is a schematic diagram showing the lens barrel.

The fixed frame 5 may be arranged to be fixed to another frame and may be arranged such that the first cam frame 4 may be rotated on the outer circumferential surface of the fixed frame 5. The fixed frame 5 may be connected to the first cam frame 4 via a bayonet B1, as shown in FIG. 4. Therefore, the first cam frame 4 is unable to move with respect to the fixed frame 5 along the optical axis C and may be arranged to be able to rotate around the optical axis C.

As shown in FIG. 3, three fixed frame straight-guiding grooves 13 extending along the optical axis C may be arranged at the fixed frame 5. Here, three fixed frame straight-guiding grooves 13 may be arranged on the cylindrical outer wall of the fixed frame 5 at different locations to divide the cylindrical outer wall of the fixed frame 5 into three substantially-equal portions. The three fixed frame straight-guiding grooves 13 may be assembled to the second pins 14 of the fourth lens group movable frame 7 described below. Furthermore, aside from the fixed frame straight-guiding grooves, three fixed frame cam grooves 15 extending around the optical axis C may be arranged at the outer wall of the fixed frame 5. Here, the fixed frame cam grooves 15 may be arranged in the circumferential direction of the cylindrical outer wall of the fixed frame 5 to divide the cylindrical outer wall of the fixed frame 5 into three substantially-equal portions.

Furthermore, the second cam frame 6 may be arranged to be able to move along the optical axis C in the fixed frame 5 and rotate around the optical axis C. In other words, the second cam frame 6 may be arranged to be able to move spirally with respect to the fixed frame 5. Three cam frame cam grooves 16 extending around the optical axis C may be arranged at the outer wall of the second cam frame 6. In this exemplary embodiment the three cam frame cam grooves 16 may be arranged in the circumferential direction of the cylindrical outer wall of the second cam frame 6 to divide the cylindrical outer wall of the second cam frame 6 into three substantially-equal portions. The three cam frame cam grooves 16 may be assembled to first pins 17 of the first frame 8 described below. Furthermore, three third pins 18 may be arranged at different locations of the cylindrical outer wall to divide the cylindrical outer wall of the second cam frame 6 into three substantially-equal portions.

The third pin 18 may be movably assembled to both of the cam frame straight-guiding groove 11 of the first cam frame 4 and the fixed frame cam grooves 15 of the fixed frame 5. Therefore, because the third pin 18 may be arranged to be assembled to both the cam frame straight-guiding groove 11 and the fixed frame cam grooves 15 that are arranged to cross each other, the third pin 18 may be arranged to have a certain size or to be larger than the certain size to ensure that the third pin 18 has a sufficient strength. Similar to the third pin 18, the first pin 17 and the second pin 14 according to the exemplary embodiment may also have a certain size or be larger than the certain size. As shown in FIGS. 1 and 2, the fourth lens group movable frame 7 may be arranged inside the second cam frame 6 to be able to move along the optical axis C. As shown in FIG. 1, a toric portion 7a may be arranged at the fourth lens group movable frame 7 at the front of the exchangeable lens 1. A cylindrical inner barrel 7b may be arranged at the inner circumferential portion of the toric portion 7a. In this exemplary embodiment, the fourth lens group G4 including a plurality of lenses may be supported by the inner barrel 7b. Therefore, as the fourth lens group movable frame 7 moves straight (forward or backward) along the optical axis C, the fourth lens group G4 may also move straight (forward or backward) along the optical axis C.

As shown in FIG. 3, the fourth lens group movable frame 7 may include three second pins 14 protruding from the outer surface of the outer wall of the toric portion 7a and the three second pins 14 may be arranged at locations that divide the outer wall of the toric portion 7a into three substantially-equal portions. As shown in FIG. 4, the second pins 14 may be movably assembled to the fixed frame straight-guiding grooves 13 of the fixed frame 5. As a result, the fourth lens group movable frame 7 may move straight along the optical axis C with respect to the fixed frame 5, but the fourth lens group movable frame 7 is unable to rotate around the optical axis C. Furthermore, as shown in FIG. 3, three movable frame straight-guiding grooves 19 extending along the optical axis C may be arranged at the outer wall of the fourth lens group movable frame 7.

Figure 5:
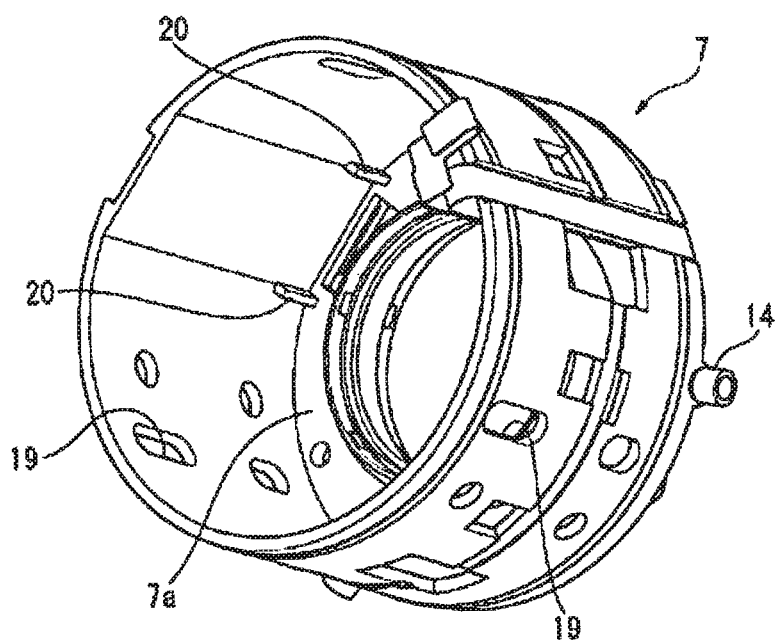
FIG. 5 is a perspective diagram showing the internal structure of a fourth lens group movable frame (second frame)

Furthermore, as shown in FIG. 4, the fourth lens group movable frame 7 may be connected to the second cam frame 6 via a bayonet B2. Therefore, the fourth lens group movable frame 7 is unable to move along the optical axis C with respect to the second cam frame 6, but the fourth lens group movable frame 7 may be arranged to be able to rotate around the optical axis C. Furthermore, as shown in FIG. 5, a pair of assembly protrusions (second assembly portions) 20 are arranged along the optical axis C between the inner surface of the toric portion 7a and the inner surface of the fourth lens group movable frame 7. The assembly protrusions 20 may be arranged to be assembled to assembly grooves (first assembly portions) 24 of the first frame 8 described below.

As shown in FIGS. 1 and 2, the fifth lens group movable frame 10 including the first frame 8 and the cylindrical lens frame 9 may be arranged inside the fourth lens group movable frame 7. As shown in FIG. 3, the first frame 8 may include a notch 21 that cuts the entire outer wall in the lengthwise direction thereof along the optical axis C. Therefore, the outer wall of the first frame 8 may have a C-like shape. Because the notch 21 cuts the entire outer wall in the lengthwise direction thereof along the optical axis C, a moving part may be accommodated and arranged inside the notch 21.

Furthermore, if thickness of a component accommodated and arranged inside the notch 21 is small in a direction parallel to the optical axis C, both side portions of the notch 21 may be connected to each other via a connecting portion at a location that is not interfered by the component. For example, as a connecting portion having a certain thickness (e.g., a small length in a direction parallel to the optical axis C) interconnects two side portions of the notch 21, the notch 21 may be arranged to interconnect portions of the outer wall of the first frame 8 in the lengthwise direction of the first frame 8.

Furthermore, the three first pins 17 may be arranged at the outer wall of the first frame 8 and the first pins 17 may be arranged at locations that divide the outer wall of the first frame 8 into three substantially-equal portions. As shown in FIG. 4, the first pins 17 may be movably assembled to both the movable frame straight-guiding groove 19 arranged at the fourth lens group movable frame 7 and a cam frame cam groove 16 arranged at the second cam frame 6. Furthermore, a plurality of connecting pins 22 may be arranged at the first frame 8 near the first pins 17. The plurality of connecting pins 22 may be inserted to connecting holes 23 of the lens frame 9, respectively.

Furthermore, assembly grooves (first assembly unit) 24 may be arranged along the optical axis C at both side portions of the notch 21 arranged at the first frame 8. As shown in FIG. 2, the pair of assembly grooves 24 may be assembled to the pair of assembly protrusions 20 of the fourth lens group movable frame 7 as described above. The assembly protrusions 20 are assembled to the assembly grooves 24 arranged at both side portions of the notch 21. For example, the assembly protrusions may slide into the assembly grooves (first assembly unit) 24. In this way, the both side portions of the notch 21 may be prevented from being separated from each other due to an unexpected force applied thereto. In other words, even if the exchangeable lens 1 is accidentally dropped and a shock is applied thereto, the assembly of the assembly protrusions 20 to the assembly grooves 24 may prevent separation of the notch 21 and thus distortion of assemblies between various pins and grooves may also be prevented.

As shown in FIG. 1, the lens frame 9 is arranged at the back of the first frame 8 and may be integrated with the first frame 8 as the connecting pins 22 of the first frame 8 are inserted to the connecting holes 23 in the outer wall of the lens frame 9 as shown in FIG. 3. The fifth lens group G5 including a plurality of lenses may be supported by the lens frame 9. Therefore, if the fifth lens group movable frame 10 moves straight (forward or backward) along the optical axis C, the fifth lens group G5 may also move straight (forward or backward) along the optical axis C.

Furthermore, as shown in FIGS. 2 and 3, the hand-shake compensating unit 25 may be assembled to the outer wall of the lens frame 9. The hand-shake compensating unit 25 is a movable part constituting a portion of a moving group and may protrude more than the outer circumferential surface of the lens frame 9. Therefore, the hand-shake compensating unit 25 may be accommodated and arranged inside the notch 21 of the first frame 8 without interfering with the first frame 8.

As previously mentioned, because the hand-shake compensating unit 25 protrudes more than the outer circumferential surface of the lens frame 9, normally, it is necessary for the first frame 8 to have a larger inner diameter to prevent a frame body from interfering with the hand-shake compensating unit 25. However, because the first frame 8 according to an exemplary embodiment includes the notch 21, the hand-shake compensating unit 25 may be arranged inside the notch 21, and thus it is not necessary for the first frame 8 to have an inner diameter larger than the outer diameter of the lens frame 9. Therefore, the inner diameter of the first frame 8 may be almost identical to the outer diameter of the lens frame 9. As a result, the size of the first frame 8 may be reduced.

In the lens barrel 2 described above, each of the lens groups G1 and G3 through G6 may move forward or backward along the optical axis C according to a rotation of the manipulation ring 3. In other words, if the manipulation ring 3 is rotated in a direction or the other direction, an electric signal may be transmitted to a camera body, a zoom motor unit may be driven based on an amount of the manipulation of the manipulation ring 3, and the first cam frame 4 may rotate.

For example, at a mechanical structure for moving the fourth lens group G4 and the fifth lens group G5, the first cam frame 4 may be rotated according to a rotation of the manipulation ring 3. Here, as shown in FIG. 4, the first cam frame 4 may be arranged at the fixed frame 5 via the bayonet B1, such that the first cam frame 4 may not move straight but may rotate. Furthermore, because the third pins 18 assembled to the cam frame straight-guiding grooves 11 of the first cam frame 4 may be assembled to the fixed frame cam grooves 15 of the fixed frame 5, the second cam frame 6 including the third pins 18 may rotate with respect to the fixed frame 5 and move straight at the same time. In other words, the second cam frame 6 may move in a spiral direction.

If the second cam frame 6 moves in a spiral direction, rotation of the fourth lens group movable frame 7 connected to the second cam frame 6 via the bayonet B2 is restricted because the second pins 14 are assembled to the fixed frame straight-guiding grooves 13 of the fixed frame 5, and thus the fourth lens group movable frame 7 may move straight with respect to the fixed frame 5. Therefore, the fourth lens group G4 installed at the fourth lens group movable frame 7 may move straight.

Furthermore, if the second cam frame 6 moves in a spiral direction, rotation of the first frame 8 (the fifth lens group movable frame 10) including the first pins 17 assembled to the cam frame cam grooves 16 of the second cam frame 6 may be restricted because the first pins 17 are assembled to the movable frame straight-guiding grooves 19 of the fourth lens group movable frame 7, and thus the first frame 8 may move straight with respect to the fixed frame 5. Therefore, the fifth lens group G5 arranged at the lens frame 9 included in the fifth lens group movable frame 10 may also move straight.

Accordingly, a zooming operation may be performed by rotating the first cam frame 4 by manipulating the manipulation ring 3.

Because the lens barrel 2 according to an exemplary embodiment may include the notch 21, the hand-shake compensating unit 25 may be accommodated and arranged inside the notch 21. Therefore, the entire diameter of the lens barrel 2 may be reduced as much as the thickness of the outer wall of the first frame 8. In addition, by using the lens barrel 2 according to an exemplary embodiment, a space for accommodating movable parts may be substantially increased, thereby saving space and reducing the size of the entire camera.

Furthermore, because the first frame 8 includes the assembly grooves 24 arranged at the both side portions of the notch 21 and the fourth lens group movable frame (the second frame) 7 includes the assembly protrusions 20 to be assembled to the assembly grooves 24, the both side portions of the notch 21 may be prevented from being separated from each other even if an unexpected force is applied thereto. Therefore, the stability of the hand-shake compensating unit 25 arranged inside the notch 21 increases and sufficient strength of the hand-shake compensating unit 25 against shocks may be secured. Furthermore, deformation of or damage to the hand-shake compensating unit 25 may be prevented, and distortion of assemblies between various pins and grooves may also be prevented.

Furthermore, at the exchangeable lens (optical apparatus) 1 including the lens barrel 2 according to an exemplary embodiment, a space may be saved by securing a space for accommodating the hand-shake compensating unit (an internal part) 25 without an additional expansion, and thus the size of the entire exchangeable lens 1 may be reduced. Furthermore, because the assembly grooves 24 are assembled to the assembly protrusions 20, the both side portions of the notch 21 may be prevented from being separated from each other even if an unexpected force is applied thereto. Furthermore, the stability of a movable part arranged inside the notch 21 and sufficient strength of the movable part against shocks may be secured. Furthermore, deformation of or damage to the movable part may be prevented, and distortion of assemblies between various pins and grooves may also be prevented.

Next, a lens barrel according to an exemplary embodiment and an exchangeable lens (optical apparatus) including the lens barrel will be described below.

In this exemplary embodiment, as previously mentioned, the exchangeable lens 1 may also include a lens barrel in which a plurality of lens groups are arranged along an optical axis, where an IF zoom lens may be embodied by the plurality of lens groups arranged inside the lens barrel.

Figure 6:
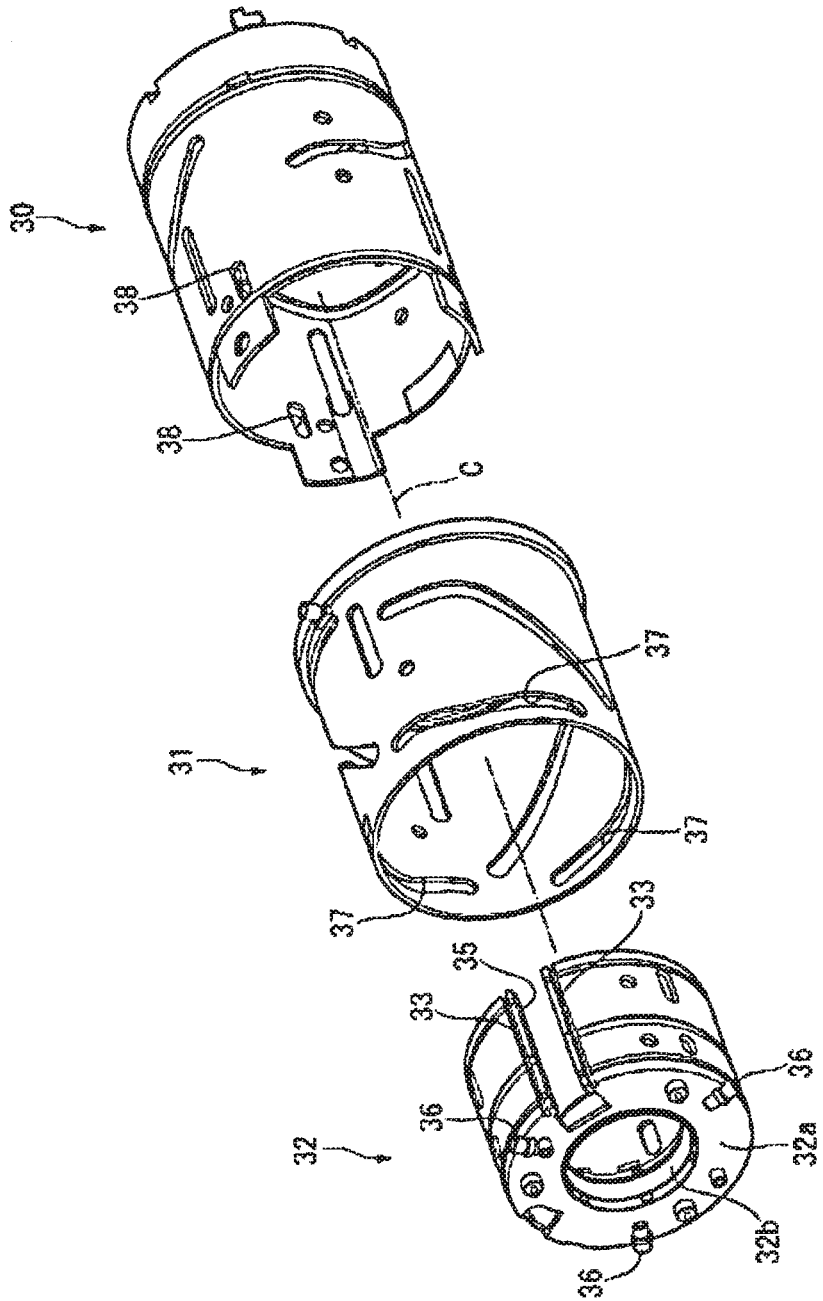
FIG. 6 is an exploded perspective view of a lens barrel according to an exemplary embodiment.

FIG. 6 is an exploded perspective view of a lens barrel according to an exemplary embodiment. In the lens barrel the reference numeral 30 denotes a cylindrical fixed frame, the reference numeral 31 denotes a cylindrical cam frame having inserted thereto the fixed frame 30, and the reference numeral 32 denotes a cylindrical movable frame inserted to the interior of the fixed frame 30. Furthermore, according to this exemplary embodiment, a single cam frame 31 is implemented and a movable frame may be embodied by a single movable frame 32. Furthermore, in this exemplary embodiment, the lens frame 9 shown in FIG. 3 may be integrated inside the movable frame 32 in the lens barrel.

The difference between the lens barrel according to the present embodiment and the lens barrel 2 according to the first embodiment is that, since the movable frame 32 may be a single element, a first assembly unit, that is, assembly grooves 33 arranged at the movable frame 32 are arranged to be assembled to assembly protrusions 34 arranged at the fixed frame 30.

For example, in the lens barrel according to this exemplary embodiment, the configuration of the movable frame 32 is similar to that of the fourth lens group movable frame 7 shown in FIGS. 1 and 3. In this exemplary embodiment, like the fourth lens group movable frame 7, the movable frame 32 may include a toric portion 32a at a side of the outer wall of the movable frame 32 and include a cylindrical inner barrel 32b at the inner circumferential portion of the toric portion 7a. Furthermore, because a lens group (the lens frame 9) is supported inside the inner barrel 32b, the supported lens group may move straight (forward or backward) as the movable frame 32 moves straight (forward or backward). A notch 35 may be arranged at the outer wall of the movable frame 32. The notch 35 is arranged by cutting the entire outer wall of the movable frame 32 in the lengthwise direction thereof along the optical axis C. Therefore, the outer wall of the movable frame 32 may have a C-like shape due to the notch 35. Like the notch 21 of the first frame 8 shown in FIG. 3, because the notch 35 may be arranged to cut the outer wall in the lengthwise direction thereof along the optical axis D, the hand-shake compensating unit 25 of the lens frame 9 shown in FIG. 3 may also be accommodated and arranged inside the notch 35.

Figure 7:
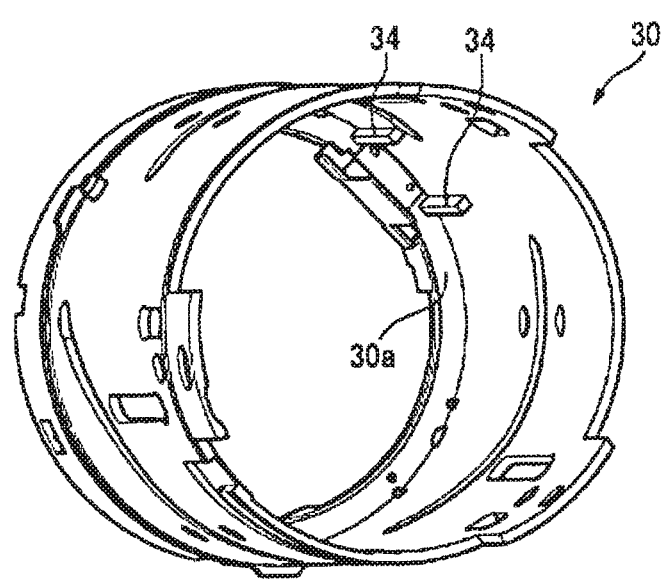
FIG. 7 is a perspective diagram showing the internal structure of a fixed frame.

The assembly grooves (first assembly unit) 33 may be arranged along the optical axis C at both side portions of the notch 35 arranged at the outer wall of the movable frame 32. Furthermore, as shown in FIG. 7, a pair of assembly protrusions (second assembly unit) 34 may be arranged along the optical axis C between the inner surface of a toric portion 30a arranged at a side of the outer wall of the fixed frame 30 and the inner surface of the fixed frame 30. The assembly protrusions 34 may be arranged to be assembled to the assembly grooves 33 of the movable frame 32. As described above, because the assembly protrusions 34 are assembled to the assembly grooves 33 at the both side portions of the notch 35, the both side portions of the notch 35 may be prevented from being separated from each other even if an unexpected force is applied thereto.

Furthermore, as shown in FIG. 6, three pins 36 may be arranged at the toric portion 32a of the movable frame 32 to protrude more than the outer circumferential surface of the outer wall of the movable frame 32, and the three pins 36 are positioned at locations that divide the outer wall of the movable frame 32 into three substantilly-equal portions. The pins 36 may be movably assembled to cam grooves 37 of the cam frame 31 and may be movably assembled to straight-guiding grooves 38 of the fixed frame 30. Furthermore, the cam grooves 37 and the straight-guiding grooves 38 may also be arranged at locations that divide the outer walls of the fixed frame 30 and the cam frame 31 into three substantially-equal portions, respectively.

At the lens barrel according to this exemplary embodiment, like the lens barrel 2 shown in FIG. 1, when the cam frame 31 rotates, the movable frame 32 may move forward or backward along the optical axis C in conjunction with the rotation of the cam frame 31. In other words, if the cam frame 31 is rotated, the lens frame 9 arranged inside the movable frame 32 moves straight together with the movable frame 32 with respect to the fixed frame 30, and thus a lens group supported by the lens frame 9 may also move straight.

Because the lens barrel according to this exemplary embodiment may include the notch 35, which is arranged to have a C-like lateral shape by equivalently removing a portion of the outer wall of the movable frame 32, the hand-shake compensating unit 25 may be accommodated and arranged inside the notch 35. Therefore, the entire diameter of the lens barrel may be reduced as much as the thickness of the outer wall of the movable frame 32. Therefore, by using the lens barrel according to this exemplary embodiment, a space for accommodating movable parts may be substantially increased, thereby saving space and reducing the size of the entire camera.

Furthermore, because the assembly grooves 33 are arranged at both side portions of the notch 35 arranged at the movable frame 32 and the assembly protrusions 34 to be assembled to the assembly grooves 33 are arranged at the fixed frame 30, the assembly of the assembly grooves 33 to the assembly protrusions 34 may prevent the both side portions of the notch 35 from being separated even if an unexpected force is applied thereto. Therefore, the stability of the hand-shake compensating unit 25 arranged inside the notch 35 and sufficient strength of the hand-shake compensating unit 25 against shocks due to accidentally dropping the exchangeable lens may be secured. Furthermore, deformation of or damage to the hand-shake compensating unit 25 may be prevented, and distortion of assemblies between various pins and grooves may also be prevented.

Furthermore, in the exchangeable lens (optical apparatus) including the lens barrel according to this exemplary embodiment, a space may be saved by securing a space for accommodating the hand-shake compensating unit (an internal part) 25 without an additional expansion, and thus the size of the entire exchangeable lens may be reduced. Furthermore, because the assembly grooves 33 are assembled to the assembly protrusions 34, the both side portions of the notch 35 may be prevented from being separated even if an unexpected force is applied thereto. Therefore, the stability of a movable part arranged inside the notch 35 and sufficient strength of the movable part against shocks may be secured. As a result, deformation of or damage to the movable part may be prevented, and distortion of assemblies between various pins and grooves may also be prevented.

Hereinafter, a lens barrel according to an exemplary embodiment and an exchangeable lens (optical apparatus) including the lens barrel will be described below. Like the exchangeable lens 1 shown in FIG. 1, the exchangeable lens according to this exemplary may include a lens barrel in which a plurality of lens groups are arranged along an optical axis, where an IF zoom lens may be embodied by the plurality of lens groups arranged inside the lens barrel.

Figure 8:
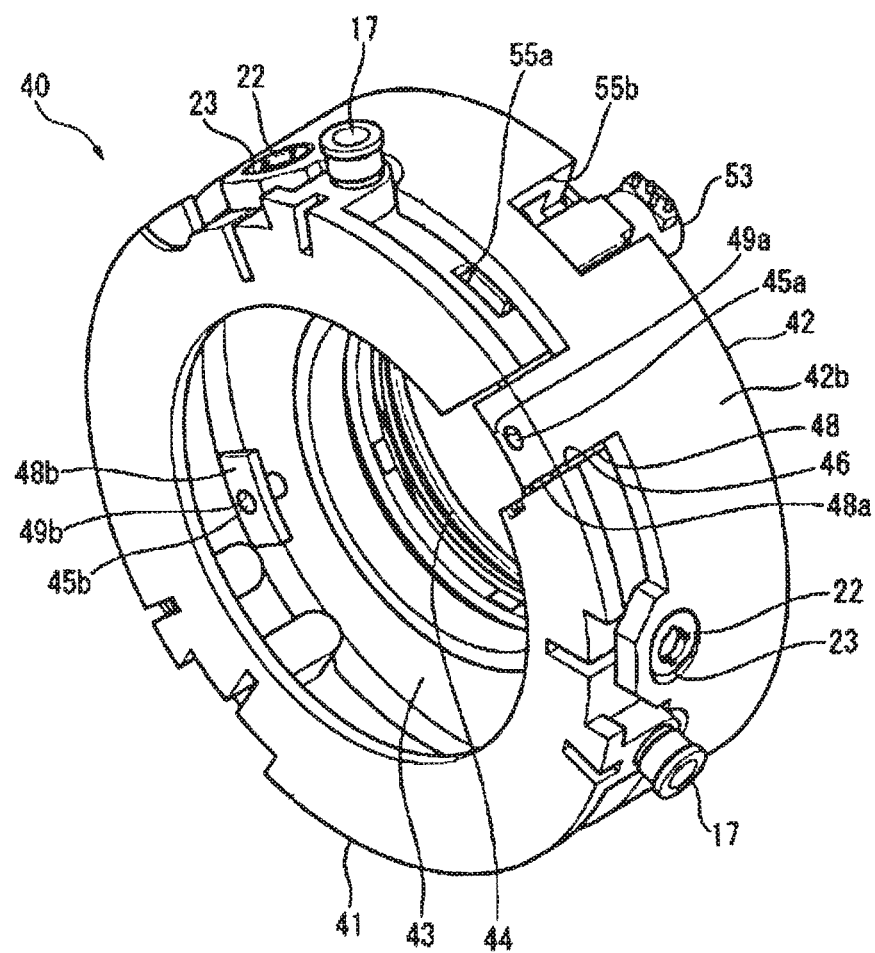
FIG. 8 is a perspective view of a fifth lens group movable frame included in a lens barrel according to an exemplary embodiment.
Figure 9:
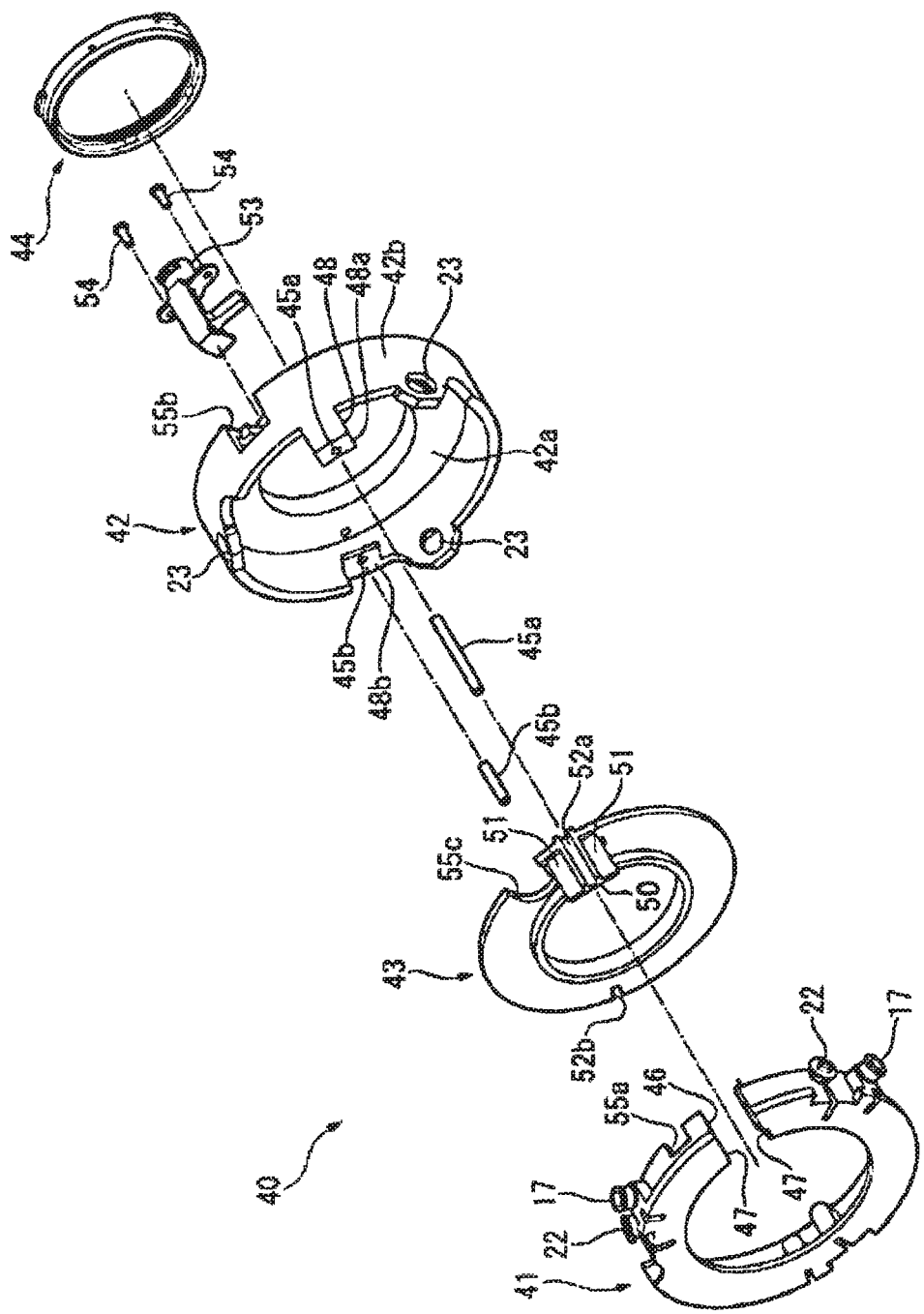
FIG. 9 is an exploded perspective view of the movable frame shown in FIG. 8.
Figure 10:
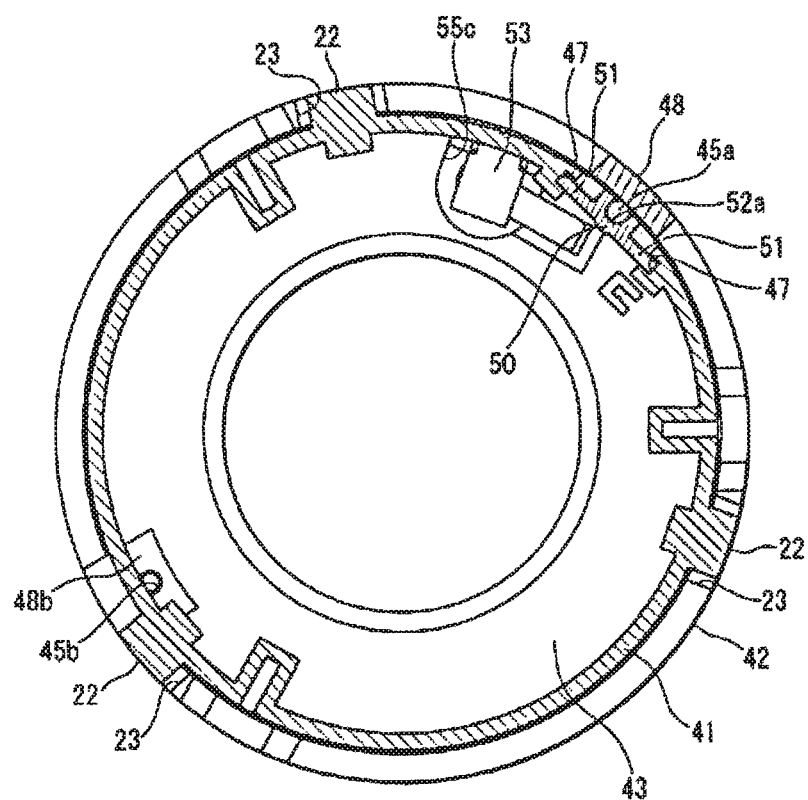
FIG. 10 is a sectional view of the movable frame shown in FIG. 8.

FIG. 8 is a perspective view of a fifth lens group movable frame 40 included in a lens barrel 2 according to an exemplary embodiment. FIG. 9 is an exploded perspective view of the fifth lens group movable frame 40 shown in FIG. 8. FIG. 10 is a sectional view of the fifth lens group movable frame 40 shown in FIG. 8. Furthermore, for convenience of explanation, descriptions of components identical to those of the exchangeable lens 1 and the lens barrel 2 will be omitted below and will be denoted by the same reference numerals.

An exchangeable lens according to this exemplary embodiment is identical to the exchangeable lens 1 including the lens barrel 2 except that the exchangeable lens according to the third embodiment includes the fifth lens group movable frame 40 consisting of a first sub-frame 41, a second sub-frame 42, a third sub-frame 43, and a lens frame 44 instead of the fifth lens group movable frame 10 that consists of the first frame 8 and the lens frame 9 and is arranged in the fourth lens group movable frame 7. Therefore, detailed descriptions of the components of the fifth lens group movable frame 40 will be given below.

As shown in FIGS. 8 through 10, the fifth lens group movable frame 40 includes the cylindrical first sub-frame 41, the cylindrical second sub-frame 42, the ring-like third sub-frame 43 that is supported by a pair of line shafts 45a and 45b between the first sub-frame 41 and the second sub-frame 42, and the cylindrical lens frame 44 that is arranged at the back of the second sub-frame 42. In addition, the fifth lens group movable frame 40 may be arranged in the aforementioned fourth lens group movable frame 7.

The first sub-frame 41 may include a notch 46 that has a C-like shape and cuts the entire outer wall of the first sub-frame 41 in the lengthwise direction thereof along the optical axis C. Furthermore, the three first pins 17 may be arranged at the outer wall of the first sub-frame 41, where the first pins 17 may be arranged at locations that divide the outer wall of the first sub-frame 41 into three substantially-equal portions. The first pins 17 may be movably assembled to both the movable frame straight-guiding groove 19 arranged at the aforementioned fourth lens group movable frame 7 and the cam frame cam groove 16 arranged at the second cam frame 6.

Furthermore, first assembly portions 47 may be respectively arranged at both side portions of the notch 46. The pair of first assembly portions 47 may form assembly grooves extending along the optical axis C at the both side portions of the notch 46.

The second sub-frame 42 may include a toric portion 42a arranged at the back of the exchangeable lens 1 and a cylindrical portion 42b arranged in front of the toric portion 42a. Furthermore, the second sub-frame 42 may include a second frame piece 48 that may be accommodated and arranged inside the notch 46. The second frame piece 48 may be a portion of the cylindrical portion 42b and may protrude forward in correspondence to the shape of the notch 46.

Furthermore, a first protruding piece 48a protruding inward along the radius-wise direction may be arranged at the leading end portion of the second frame piece 48. Furthermore, a second protruding pieces 48b protruding inward along the radius-wise direction may be arranged at a location of the cylindrical portion 42b opposite to the second frame piece 48.

Shaft holes 49a and 49b to which line shafts 45a and 45b are respectively inserted may be arranged at the protruding pieces 48a and 48b. Furthermore, shaft holes may be arranged at locations of the toric portion 42a respectively facing the shaft holes 49a and 49b. The line shafts 45a and 45b may be inserted to the shaft holes 49a and 49b, and thus the line shafts 45a and 45b may be supported between the protruding pieces 48a and 48b and the toric portion 42a along directions parallel to the optical axis C.

As the second frame piece 48 arranged at the second sub-frame 42 is arranged inside the notch 46 and the connecting pins 22 arranged at the outer wall of the first sub-frame 41 are inserted to the connecting holes 23 arranged at the outer wall of the second sub-frame 42, the first sub-frame 41 and the second sub-frame 42 may be assembled to each other.

The third sub-frame 43 may include a first frame piece 50 that may be arranged inside the notch 46. The first frame piece 50 may protrude forward from the outer circumferential portion of the third sub-frame 43 in correspondence to the shape of the notch 46. The second frame piece 48 may be arranged inside the notch 46 while the second frame piece 48 overlaps the outer circumferential surface of the first frame piece 50.

The third sub-frame 43 may include a pair of second assembly portions 51 that are assembled to the pair of first assembly portions (assembly grooves) 47. The pair of second assembly portions 51 may include assembly protrusions extending along the optical axis C at both side end portions of the first frame piece 50.

Figure 11:
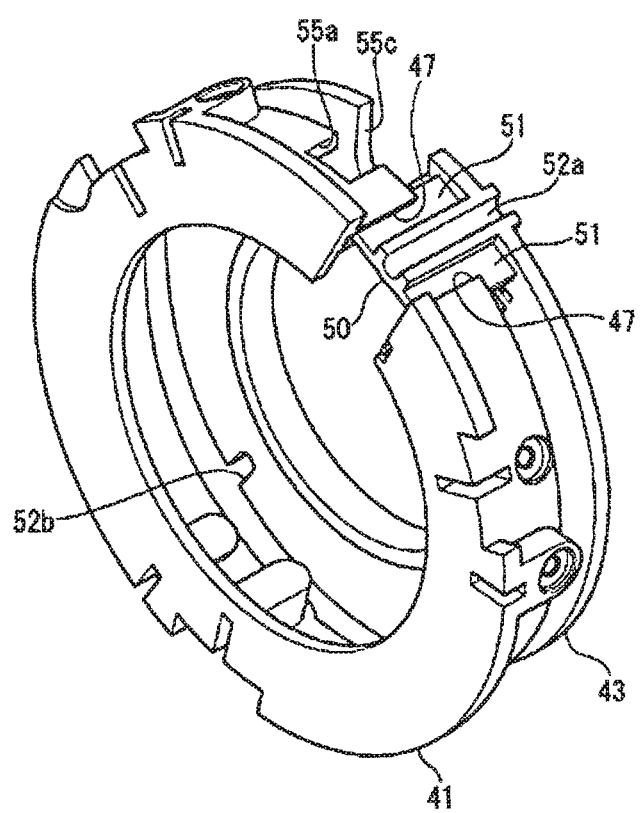
FIG. 11 is a perspective diagram showing that first assembly portions are assembled to second assembly portions.
Figure 12:
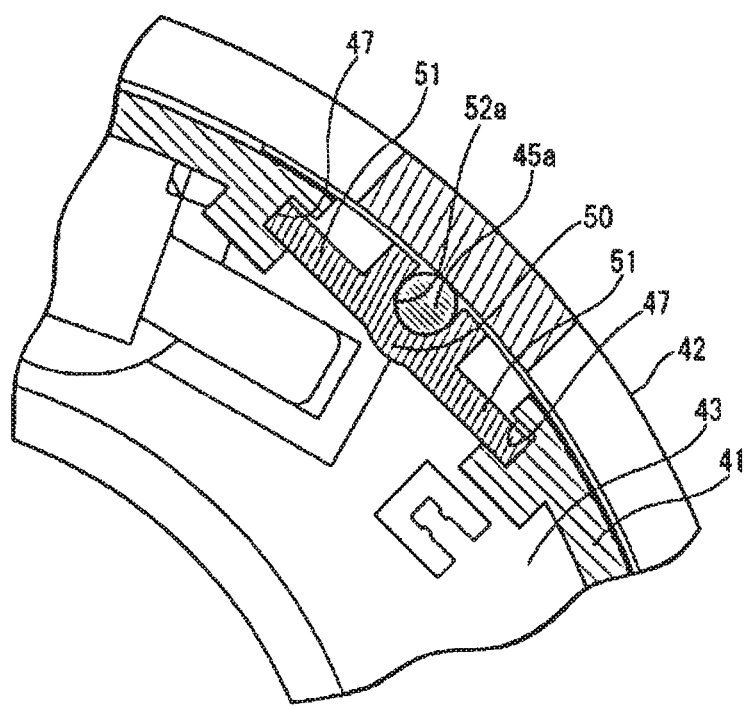
FIG. 12 is a sectional view showing a portion of the movable frame shown in FIG. 10 in closer detail.

As shown in FIGS. 11 and 12, at the fifth lens group movable frame 40, the second assembly portions (assembly protrusions) 51 at the both side portions of the first frame piece 50 may be assembled to the first assembly portions (assembly grooves) 47 at the both side portions of the notch 46, respectively. Furthermore, at the fifth lens group movable frame 40, the second assembly portions (assembly protrusions) 51 may be assembled to be able to slide along the optical axis C in the first assembly portions (assembly grooves) 47. Furthermore, FIG. 11 is a perspective diagram showing that the first assembly portions (assembly grooves) 47 are assembled to the second assembly portions (assembly protrusions) 51. Furthermore, FIG. 12 is a sectional view showing a portion of the fifth lens group movable frame 40 shown in FIG. 10 in closer detail.

As shown in FIGS. 8 through 12, the third sub-frame 43 may include first and second connecting portions 52a and 52b to which the first and second line shafts 45a and 45b are assembled. The first connecting portion 52a may include a connecting groove arranged on the outer circumferential surface of the first frame piece 50 to extend along the optical axis C. The first line shaft 45a may be assembled between the first connecting portion (assembly groove) 52a and the second frame piece 48. The second connecting portions 52b may include a connecting groove arranged on the outer circumferential surface of the third sub-frame 43 to extend along the optical axis C. The second line shaft 45b may be assembled between the second connecting portion (assembly groove) 52b and the second frame piece 48.

Therefore, the third sub-frame 43 may move along the optical axis C by using the pair of the line shafts 45a and 45b arranged between the first sub-frame 41 and the second sub-frame 42 while the third sub-frame 43 is supporting some lenses included in the fifth lens group G5.

Furthermore, the third sub-frame 43 may be driven by a motor 53 to move straight forward or backward. The motor 53 may be assembled to the second sub-frame 42 via screws 54. Furthermore, the motor 53 may be arranged inside cut portions 55a, 55b, and 55c respectively arranged at the first sub-frame 41, the second sub-frame 42, and the third sub-frame 43. The third sub-frame 43 may be assembled via lead screws rotation-driven by the motor 53 and nuts. Therefore, the third sub-frame 43 may be driven straight forward or backward.

As shown in FIGS. 8 and 9, the lens frame 44 may be inserted to the second sub-frame 42 from the back of the second sub-frame 42 and integrated with the second sub-frame 42 while the lens frame 44 supports the other lenses included in the fifth lens group G5. Therefore, the first sub-frame 41, the second sub-frame 42, the third sub-frame 43, and the lens frame 44 may constitute the fifth lens group movable frame 40. Therefore, if the fifth lens group movable frame 40 moves straight (forward or backward) along the optical axis C, the fifth lens group G5 may also move straight (forward or backward) along the optical axis C.

According to an exemplary embodiment, the first sub-frame 41 may include the notch 46 and thus the outer wall of the first sub-frame 41 may be arranged to have a C-like shape. Therefore, an accommodation space may be secured inside the notch 46. Therefore, the entire diameter of the lens barrel 2 may be reduced as much as the thickness of the outer wall of the first sub-frame 41.

Furthermore, the first sub-frame 41 may include the first assembly portions (assembly grooves) 47 at both side portions of the notch 46, and the third sub-frame 43 may include the second assembly portions (assembly protrusions) 51 to be assembled to the first assembly portions 47. Therefore, the assembly between the first assembly portions 47 and the second assembly portions 51 may maintain a distance between the both side portions to prevent from being narrowed due to an unexpected force.

For example, if an unexpected shock is applied to the exchangeable lens 1, because the second assembly portions (assembly protrusions) 51 may be assembled to the first assembly portions (assembly grooves) 47, a distance between the both side portions of the notch 46 is maintained. As a result, distortion of assemblies between various pins and grooves may be prevented. Therefore, components arranged inside the notch 46 may have sufficient positional stability or shock resistance.

Furthermore, in the fifth lens group movable frame 40 according to this exemplary embodiment, the third sub-frame 43 may include the first frame piece 50 arranged inside the notch 46, where the first connecting portion 52a may be arranged at the first frame piece 50. Therefore, the first connecting portion 52a may be arranged inside the notch 46, thereby preventing expansion of the entire diameter of the lens barrel 2.

Furthermore, the second sub-frame 42 may include the second frame piece 48 that is assembled to the second sub-frame 42 to overlap the outer circumferential surface of the first frame piece 50 and is arranged inside the notch 46. The first connecting portion 52a may be a connecting groove arranged on the outer circumferential surface of the first frame piece 50, and the first line shaft 45a may be arranged between the connecting groove and the second frame piece 48. Therefore, even if a shaft hole for supporting the first line shaft 45a is not arranged at the first frame piece 50, the first line shaft 45a arranged between the connecting groove arranged on the outer circumferential surface of the first frame piece 50 and the second frame piece 48 may be sufficiently supported, thereby preventing expansion of the entire diameter of the lens barrel 2.

Although embodiments of the inventive concept have been described above with reference to the assembled drawings, the inventive concept is not limited thereto. Shapes or combinations of the components in the above-stated embodiments are merely examples, where various modifications may be made therein according to design demands without departing from the technical spirit of the inventive concept.

For example, although three pins or three grooves to be assembled thereto are arranged at angle locations that divide a circumference around the optical axis C into three almost equal portions in the above exemplary embodiments, the number of such pins or grooves is not limited to be three. For example, the number of such pins or grooves may be two or four or more. If the number of such pins or grooves is not three, such pins or grooves may be arranged at locations that divide a circumference into the same number of almost equal portions.

Furthermore, although a first assembly unit includes assembly grooves and a second assembly unit includes assembly protrusions in the above-stated embodiments, the first assembly unit may include assembly protrusions and the second assembly unit may include assembly grooves. Furthermore, as long as they have structures to be assembled to each other, the first assembly unit and the second assembly unit are not limited to assembly grooves and assembly protrusions and may employ various assembly structures, e.g., concave assembly portions and convex assembly portions.

Furthermore, although the first cam frame 4 or the cam frame 31 is arranged outside the fixed frame 5 or 30 in the above exemplary embodiments, the first cam frame 4 or the cam frame 31 may be arranged inside the fixed frame 5 or 30.

According to exemplary embodiments, a space for accommodating movable parts may be reduced, and thus the sizes of an entire lens barrel and an optical apparatus may be reduced. Furthermore, because an assembly between a first assembly unit and a second assembly unit may prevent separation of a notch, sufficient arrangement stability or shock-resistance of movable parts arranged at the notch may be secured, and thus deformation of or damage to the movable parts may be prevented.

It should be understood that exemplary embodiments described herein should be considered descriptions, not limitations. Descriptions of features or aspects within each exemplary embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A lens barrel comprising:
   a cylindrical fixed frame extending along an optical axis; and
   a cylindrical movable frame configured to move along the optical axis with respect to the cylindrical fixed frame, the cylindrical movable frame comprising:
   a cylindrical first frame comprising an outer wall extending around the optical axis; and
   a cylindrical second frame, configured to insert the cylindrical first frame into the cylindrical second frame,
   wherein the cylindrical first frame comprises a notch that forms an opening in the outer wall by cutting the outer wall in a lengthwise direction such that the outer wall has a C-like shape and the opening is formed along an entirety of the lengthwise direction of the outer wall,
   wherein the cylindrical first frame comprises assembly grooves at each side of the notch,
   wherein the cylindrical second frame comprises assembly protrusions configured to be inserted into the assembly grooves to support both sides of the notch, and
   wherein a movable part is accommodated inside the notch.

2. The lens barrel of claim 1, further comprising:
   a first cam frame, configured to rotate with respect to the cylindrical fixed frame around the optical axis; and
   a cylindrical cam frame, configured to rotate around the optical axis in conjunction with the rotation of the first cam frame and move along the optical axis,
   wherein the cylindrical first frame and the cylindrical second frame are further configured to move along the optical axis in conjunction with the rotation and the movement of the cylindrical cam frame.

3. The lens barrel of claim 2, further comprising:
   a manipulation ring, configured to rotate around the optical axis; and
   a zoom motor unit, configured to drive the first cam frame to rotate according to a rotation amount of the manipulation ring.

4. The lens barrel of claim 1, wherein the movable part accommodated inside the notch is a hand-shake compensating unit.

5. The lens barrel of claim 1,
   wherein the assembly grooves extend along the optical axis and the assembly protrusions extend along the optical axis.

6. The lens barrel of claim 1, further comprising a connecting portion having a predetermined thickness that connects each side of the notch to each other.

7. The lens barrel of claim 1, wherein a single lens or a plurality of lenses are arranged at each of the cylindrical first frame and the cylindrical second frame.

8. An optical apparatus comprising the lens barrel of claim 1.

9. A lens barrel comprising:
   a cylindrical fixed frame extending along an optical axis; and
   a cylindrical movable frame configured to move along the optical axis with respect to the cylindrical fixed frame, the cylindrical movable frame comprising:
   an outer wall extending around the optical axis, the outer wall comprising a notch that forms an opening in the outer wall by cutting the outer wall in a lengthwise direction such that the outer wall has a C-like shape and the opening is formed along an entirety of the lengthwise direction of the outer wall,
   wherein the cylindrical movable frame comprises assembly grooves at each side of the notch, and
   wherein the cylindrical fixed frame comprises assembly protrusions configured to be inserted into the assembly grooves to support both sides of the notch, and
   wherein a movable part is accommodated inside the notch.

10. The lens barrel of claim 9, further comprising:
    a cylindrical cam frame, configured to rotate with respect to the cylindrical fixed frame around the optical axis,
    wherein the cylindrical movable frame is further configured to move along the optical axis in conjunction with the rotation of the cylindrical cam frame.

11. The lens barrel of claim 9, wherein the movable part accommodated inside the notch is a hand-shake compensating unit.

12. The lens barrel of claim 9,
    wherein the assembly grooves extend along the optical axis and the assembly protrusions extend along the optical axis.

13. A lens barrel comprising:
    a cylindrical fixed frame extending along an optical axis; and
    a cylindrical movable frame configured to move along the optical axis with respect to the cylindrical fixed frame along the optical axis,
    wherein the cylindrical movable frame comprises a first sub-frame including an outer wall extending around the optical axis, a second sub-frame, and a third sub-frame that is supported by a pair of line shafts arranged between the first sub-frame and the second sub-frame,
    wherein the first sub-frame comprises a notch that forms an opening in the outer wall by cutting the outer wall in a lengthwise direction thereof,
    wherein the first sub-frame comprises assembly grooves at each side of the notch,
    wherein the second sub-frame comprises a pair of shaft holes configured to allow the pair of line shafts to be inserted in, and
    wherein the third sub-frame comprises assembly protrusions configured to be inserted into the assembly grooves, and
    wherein a first frame piece and grooves arranged in an outer circumferential surface of the first frame piece are accommodated inside the notch.

14. The lens barrel of claim 13,
    wherein the assembly grooves extend along the optical axis and the assembly protrusions extend along the optical axis.

15. The lens barrel of claim 14, wherein a single lens or a plurality of lenses are arranged at the third sub-frame.

16. The lens barrel of claim 13, wherein the second sub-frame comprises a second frame piece, configured to be arranged inside the notch to overlap an outer circumferential surface of the first frame piece, and wherein the pair of line shafts are arranged between the grooves and the second frame piece.

* * * * *